Dec. 20, 1927.  1,653,376
J. S. SKELLY
ARC WELDING MACHINE
Filed April 8, 1925   3 Sheets-Sheet 3
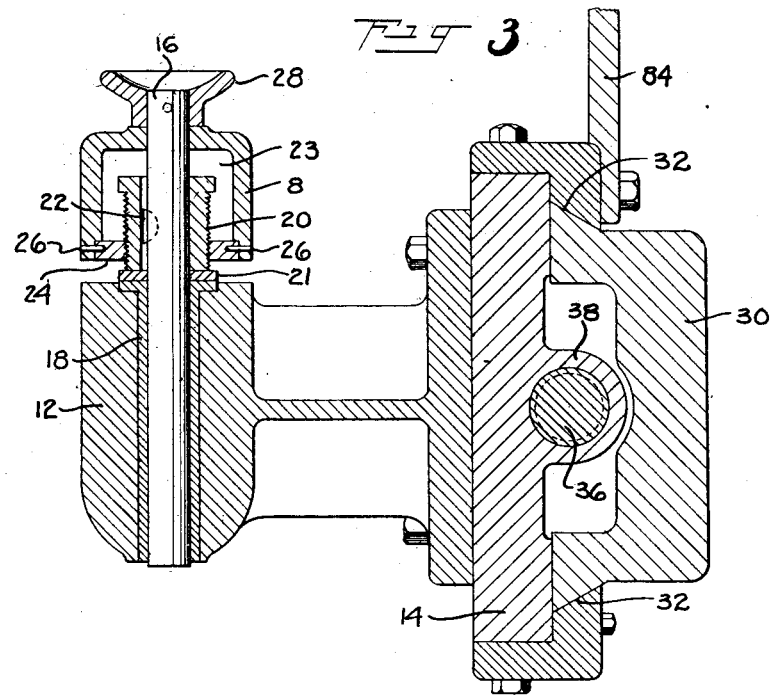
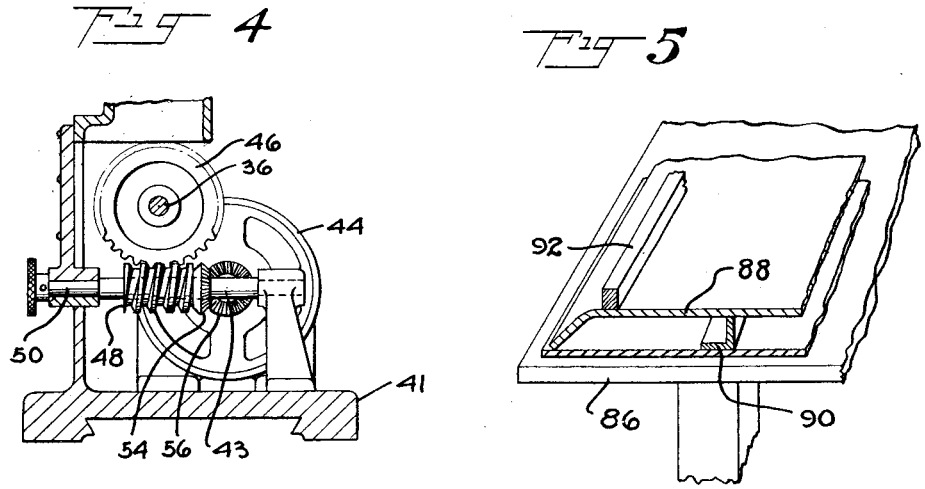
INVENTOR.
J. S. Skelly
BY
ATTORNEYS.

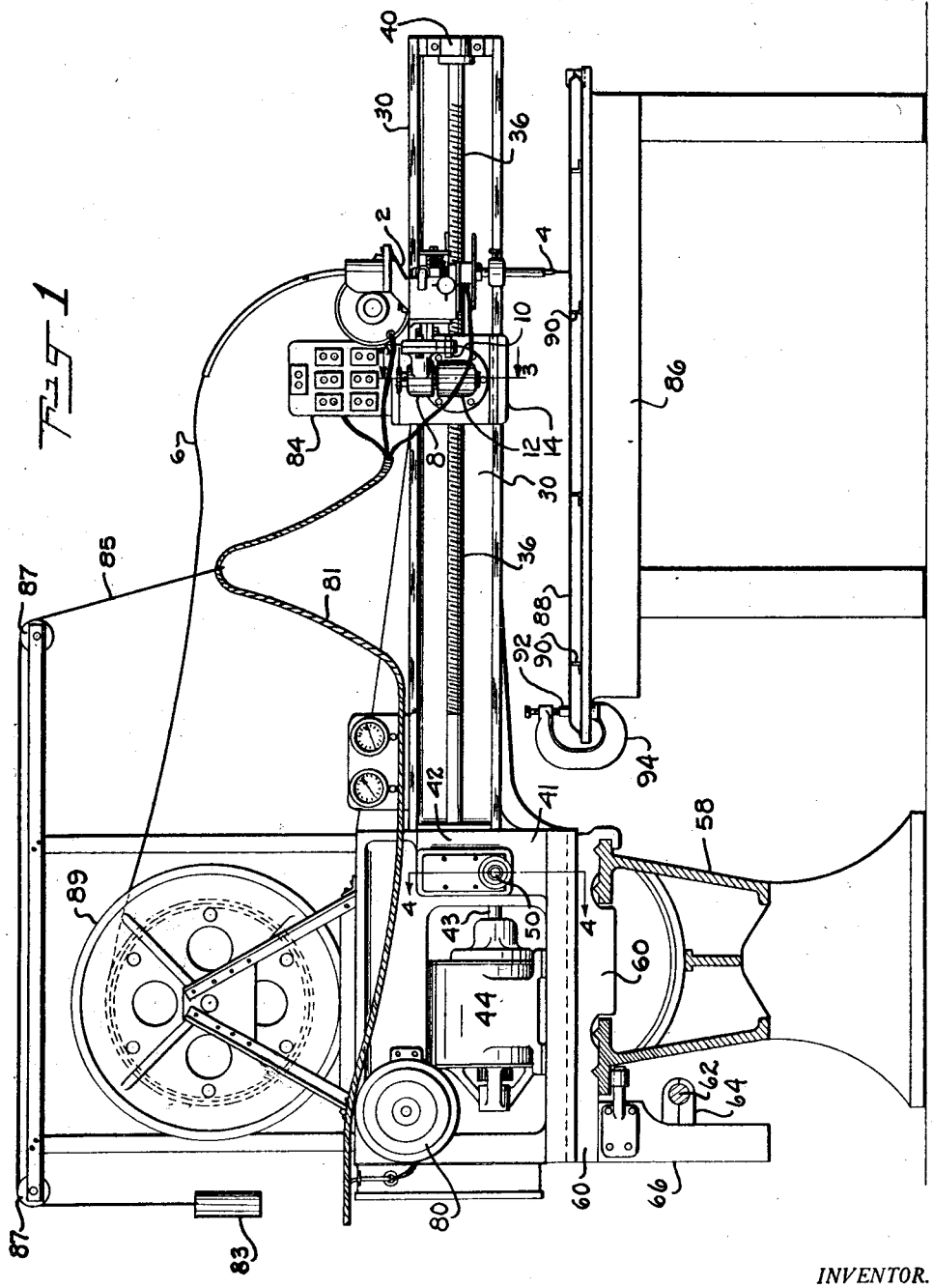

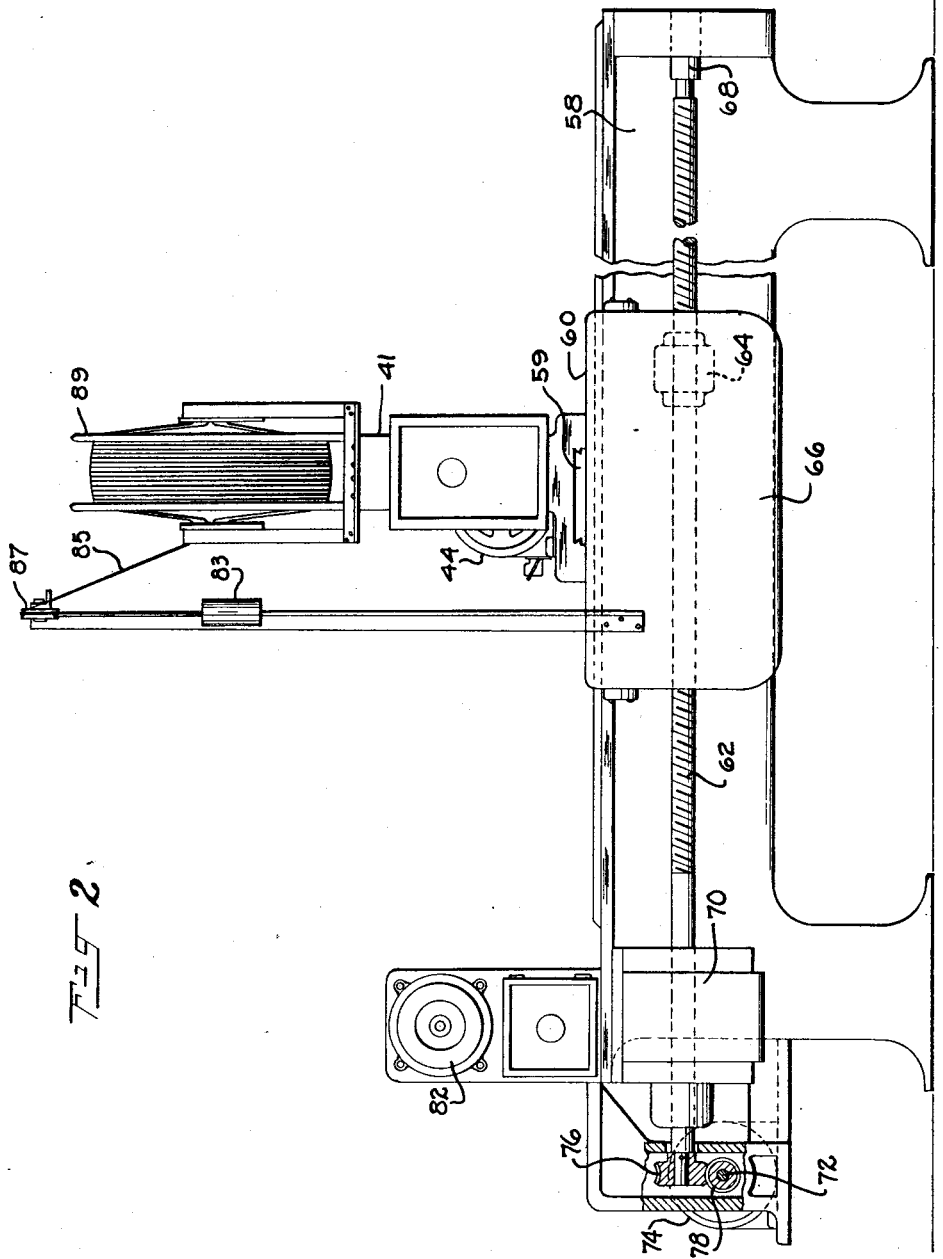

Patented Dec. 20, 1927.

1,653,376

UNITED STATES PATENT OFFICE.

JOHN S. SKELLY, OF MONONGAHELA, PENNSYLVANIA, ASSIGNOR TO INTERNATIONAL COMBUSTION ENGINEERING CORPORATION. OF NEW YORK. N. Y., A CORPORATION OF DELAWARE.

ARC-WELDING MACHINE.

Application filed April 8, 1925. Serial No. 21,480.

Air heaters of the type which are used in connection with stoker furnaces for utilizing a substantial portion of the heat of the waste gases of combustion to heat air and to direct the heated air into the furnace to support combustion, are commonly made up of a plurality of air heating elements which are arranged side by side and spaced apart so as to provide gas passes between them. Each of the air heating elements usually consists of two sheet metal plates arranged side by side and spaced apart with both of their end edges and one of their longitudinal edges closed and the other longitudinal edge closed except for inlet and outlet openings adjacent to their upper and lower ends, respectively, for permitting the air to be heated to pass between the plates. The plates which make up the air heating elements are relatively thin, and in some cases are upwards of 6 by 20 feet in area, and because of this it has been a serious problem to close their edges, in such a manner as to prevent danger of leakage between the air and waste gases.

An object of the present invention is to provide a novel and improved method of welding which is particularly adapted for use in welding the edges of the plates of an air heating element or similar article.

Another object of the invention is to provide a novel and improved arc welding machine which is particularly adapted for use in carrying out the method.

Another object of the invention is to provide an arc welding machine in which power operated means under the control of the operator is provided for moving the welding head back and forth for any desired distances in two paths transverse to each other.

Another object of the invention is to provide an arc welding machine which is capable of being easily controlled by the operator to form a continuous weld about a rounded corner.

Another object of the invention is to provide an arc welding machine in which the welding head is mounted for adjustment in a novel and improved manner.

The several features of the invention, whereby the above-mentioned and other objects may be attained, will be clearly understood from the following description and accompanying drawings, in which:

Figure 1 is a front elevation, partly in section, of an arc welding machine which is particularly adapted for use in welding the edges of the plates of an air heating element, the air heating element being shown in transverse section in position to be operated upon;

Fig. 2 is a side elevation, partly in section and partly broken away of the machine;

Fig. 3 is a detail sectional view on an enlarged scale taken on the line 3—3 of Fig. 1;

Fig. 4 is a detail sectional view on an enlarged scale taken on the line 4—4 of Fig. 1; and Fig. 5 is a view in perspective, partly in section, of a portion of the plates of an air heating element, assembled upon the work supporting table of the machine ready for the welding operation.

The arc welding machine illustrated in the drawings is provided with a welding head 2 which may be of a well known construction having a nozzle 4 and suitable devices for feeding the welding material 6 through the nozzle to the seam to be welded. In accordance with my invention a rearwardly projecting bracket arm 8 is secured by bolts 10 to the back of the welding head, and its outer end is pivotally mounted on a bracket member 12 projecting from a block 14. This pivotal mounting for the bracket arm 8 on the bracket member 12 comprises a pin 16 which extends through a vertical aperture in the bracket arm 8 and has its lower portion extending through and mounted for turning movement in a bearing sleeve or bushing 18 which is mounted in an aperture in the bracket member 12. The welding head and bracket arm 8 is adapted to be adjusted vertically with relation to the bracket member 12 to be compensated for work of different thicknesses. To provide for this a sleeve 20 is mounted to slide longitudinally on the pivot pin 16 but is held from turning movement by means of a key or spline 22 which extends into a keyway in the sleeve, the under side of the hub of the bracket arm 8 being cut away at 23 to receive the sleeve. A washer 21 is interposed between the lower end of the sleeve 20 and the upper end of the bushing 18. The outer cylindrical surface of the sleeve 20 is provided with screw threads that engage screw threads in a nut 24 which is secured by pins 26 within the lower end of the cut away portion of the bracket arm 8. A hand wheel 28 is secured on the upper end of the pivot pin 16. With this construction by turning the pin 16 by means of the hand wheel 28, the sleeve 20 may be turned with relation to the nut 24 and thus the welding head and bracket arm may be adjusted vertically as desired.

The block 14 that carries the bracket member 12 and welding head is mounted to slide longitudinally on a supporting arm 30, the back of the block 14 being in engagement with the supporting arm through a dovetail joint connection 32. The carrier block 14 and the welding head are adapted to be thus moved back and forth along the supporting arm 30 by means of a lead screw 36 which is screw-threaded through a nut 38 on the rear side of the block, and has one end journaled in a bearing 40 on one end of the supporting arm and its other end extending through and journaled in a bearing 42 adjacent the other end of the supporting arm, the later end of the arm being provided with an enlarged head 41. The lead screw is connected through suitable speed reducing gearing with the shaft 43 of an electric motor 44 mounted on the head 41. This gearing comprises a worm wheel 46 (Figs. 1 and 4) secured on the end of the lead screw which is engaged by a worm 48 secured on a counter shaft 50 having its ends journaled in suitable bearings on the head of the supporting arm and connected with the motor shaft 43 through bevel gears 54 and 56 secured on the counter and motor shafts, respectively.

The head of the supporting arm is secured by a fixed dove-tail joint 59 on a base plate 60 which is suitably mounted to slide upon a supporting bed 58 arranged transverse of the supporting arm. The supporting arm is adapted to be moved longitudinally of the bed 58 by means of a lead screw 62 which is screw-threaded through a nut 64 projecting from a depending bracket 66 on the base plate 60. The lead screw has one end journaled in a suitable bearing 68 on the rear end of the bed and has its other end extending through and journaled in a suitable bearing 70 on the forward end of the bed. The lead screw is driven through suitable speed reducing gearing from the shaft 72 of an electric motor 74 mounted on the forward end of the supporting bed. As shown this gearing comprises a worm wheel 76 and a worm 78 mounted on the ends of the lead screw and motor shaft, respectively. The speeds of the motors 44 and 74 are controlled by rheostats 80 and 82, respectively, which are suitably mounted on the supporting arm and bed.

The motors are adapted to be independently thrown into and out of operation and the rheostats to be controlled to vary the speeds of the motors through suitable electrical connection with devices mounted upon a panel board 84 carried by the sliding block 14. Also mounted upon this panel board are suitable devices for throwing the welding head into and out of operation and for varying the rate of feed of the welding material in a well known manner. The electrical conductors leading to the panel board and welding head are enclosed by a flexible covering 81 which is held up out of the way during the operation of the machine by a weight 83 that is connected therewith by a cord 85 which passes over sheaves 87. A reel 89 is suitably mounted upon the enlarged end or head of the supporting arm 30 on which the welding material 6 is wound.

With this construction it will be apparent the operator by means of the controlling devices conveniently mounted on the panel board 84, may cause the carrier block 14 and the welding head to be moved back and forth as desired on the supporting arm and at such rate of speed as desired; also may cause the supporting arm 30 that carries the carrier block 14 and welding head to be moved back and forth as desired on the supporting bed 58 and at whatever rate of speed is desired, and also may vary the rate of feed of the welding material in accordance with the speed of the feeding movement of the welding head. Also during the operation of the machine the operator may turn the welding head freely about its pivot as desired, and may by means of the hand wheel 28 adjust the welding head vertically to bring the nozzle 4 toward and from the work. Thus the operator while he directs the welding nozzle with one hand, may with his other hand completely control the operation of the machine.

A suitable work supporting table 86 is positioned beneath the supporting arm 30. The illustrated machine is particularly adapted for use in welding the edges of the plates 88 of an air heating element. When thus employed the two plates are positioned one upon the other upon the table 86 with suitable spacing members 90 arranged between them. As shown, one of the longitudinal edges of the top plate is bent inwardly and the other longitudinal edges of both plates are bent inwardly so that when the plates are assembled their longitudinal edges are positioned together, the same being true of the end or transverse edges of the plates. The plates are of such relative size, however, that when they are assembled the edges of the top plate is spaced a slight distance inside of the edges of the bottom plate which provides a trough-like recess for receiving the fused welding material. When the plates are thus assembled they are clamped down upon the table so as to bring their edges tightly together. Any suitable clamping means may be employed for this purpose, as for example, a bar 92 may be laid over the top plate adjacent to the edge to be welded and clamped down by means of suitable clamps 94. On account of the large area of the plates considerable clamping pressure is required to insure their edges tightly engaging throughout, and such pressure would be liable to spring or disrupt the plates adjacent their edges if it were not for the spacing members 90 which are of proper height or thickness as to cause them to bear the clamping pressure.

When the plates are thus clamped down upon the table the operator starts at one corner of the plates and by means of the controlling devices on the panel-board 84 simultaneously throws the welding head and one of the electric motors into operation, depending upon which edge he desires to weld first. As the welding head traverses over this edge the operator guides the nozzle 4 so as to cause the welding material to be applied. When this edge of the plate is welded, the operator throws the motor thus employed out of operation and throws the other motor into operation in the right direction to cause the head to be moved at right angles and traverse over the adjacent edge to permit the operator to guide the nozzle to weld this edge. In a similar manner the other two edges of the plates may be welded. It will be apparent that the machine is capable of welding in a continuous path, that the direction of weld may be changed as desired, and that by throwing the welding head out of operation the weld may be interrupted as desired. The plates of air heating elements of the character indicated are in certain cases provided with one of their corners rounded. The provision, however, for turning the welding head about a vertical axis permits a rounded corner to be welded without interrupting the operation of the machine, the operator merely turning the head as it is carried along adjacent to the corner to permit him by means of the nozzle to properly direct the welding material into the seam of the rounded corner. Also such provision for turning the welding head about a vertical axis permits the head to be most conveniently positioned as the direction of weld is changed from one edge of the plates to another. The provision for vertical adjustment of the welding head by turning the hand wheel 28 permits the head to be adjusted for different thicknesses of work.

As will be evident to those skilled in the art, my invention permits various modifications without departing from the spirit thereof or the scope of the appended claims.

What I claim is:

1. An arc welding machine of the class described having, in combination, an arc welding head, a carrier on which the head is mounted for turning movement about a vertical axis spaced a distance back of the point of delivery of the welding material from the head, and power operated means under the control of the operator for moving the carrier back and forth in two paths transverse to each other.

2. An arc welding machine of the class described having, in combination, an arc welding head, a carrier therefor, connections between the head and carrier constructed to permit the head to be turned about a vertical axis and to be adjusted vertically with relation to the carrier, and power operated means for moving the carrier back and forth in two substantially horizontal paths transverse to each other.

3. An arc welding machine of the class described having, in combination, an arc welding head, a mounting for the welding head to permit the head to be turned about a vertical axis spaced a distance back of the point of delivery of the welding material from the head, a support for an air heating element or similar article to be welded, and power operated means under the control of the operator for relatively moving said mounting and support back and forth in two paths transverse to each other.

4. An arc welding machine of the class described having, in combination, an arc welding head a carrier therefor, connections between the head and carrier constructed to permit the head to be turned about a vertical axis with relation to the carrier, a support upon which the carrier is mounted for movement back and forth in a horizontal path, and power operated means under the control of the operator for thus moving said carrier.

5. An arc welding machine of the class described having, in combination, an arc welding head, a supporting arm upon which the head is mounted for movement longitudinally thereof, power operated means under the control of the operator and comprising an electric motor and suitable connections mounted on the arm for moving the head longitudinally of the arm in either direction, a supporting bed arranged transversely of the arm and upon which one end of the arm is mounted for movement longitudinally thereof, and power operated means under the control of the operator and comprising an electric motor and suitable connections for moving the arm in either direction longitudinally of the bed.

In testimony whereof, I have signed my name to this specification this 6th day of April, 1925.

JOHN S. SKELLY.